(12) United States Patent
Kinsella

(10) Patent No.: US 12,292,034 B2
(45) Date of Patent: May 6, 2025

(54) OFFSHORE WIND TURBINE SYSTEM FOR THE LARGE SCALE PRODUCTION OF HYDROGEN

(71) Applicant: ENVIRONMENTAL RESOURCES MANAGEMENT LTD., London (GB)

(72) Inventor: Kevin Gary Kinsella, Cheshire (GB)

(73) Assignee: Environmental Resources Management Ltd., London (GB)

( * ) Notice: Subject to any disclaimer, the term of this patent is extended or adjusted under 35 U.S.C. 154(b) by 151 days.

(21) Appl. No.: 17/292,085

(22) PCT Filed: Nov. 9, 2018

(86) PCT No.: PCT/GB2018/053251
§ 371 (c)(1),
(2) Date: May 7, 2021

(87) PCT Pub. No.: WO2020/095012
PCT Pub. Date: May 14, 2020

(65) Prior Publication Data
US 2021/0404439 A1 Dec. 30, 2021

(51) Int. Cl.
*F03D 9/19* (2016.01)
*C25B 1/04* (2021.01)
(Continued)

(52) U.S. Cl.
CPC ............. *F03D 9/19* (2016.05); *C25B 1/04* (2013.01); *C25B 9/65* (2021.01); *C25B 15/085* (2021.01); *F03D 13/25* (2016.05); *F05B 2220/61* (2013.01)

(58) Field of Classification Search
CPC ................................... C25B 1/04; F03D 9/19
See application file for complete search history.

(56) References Cited

U.S. PATENT DOCUMENTS 7,075,189 B2   7/2006  Heronemus et al.
7,453,164 B2 * 11/2008  Borden .................. F03D 13/25
                                                          123/3

(Continued)

FOREIGN PATENT DOCUMENTS

JP   2005-520088 A   7/2005
NL      2017797 B1   5/2018
WO   2014/083684 A1   6/2014

OTHER PUBLICATIONS

Japan Patent Office, Notification of Reasons for Rejection (with partial English translation), Japanese Patent Application No. 2021-525294, 5 pages Sep. 12, 2022.

(Continued)

*Primary Examiner* — Brian W Cohen
(74) *Attorney, Agent, or Firm* — Eversheds Sutherland (US), LLP

(57) ABSTRACT

An offshore wind turbine system for the large scale production of hydrogen from seawater that includes a floating tower structure, a wind turbine generator, a lift pump, a desalination unit, an electrolysis unit, and an export riser. The floating tower structure may be secured to the sea floor by a suction anchor for deepwater deployment. The lift pump, desalination unit, and electrolysis unit are powered by the wind turbine generator and configured to pump, desalinate, and electrolytically split seawater, respectively. The hydrogen generated by the electrolysis unit is provided to the export riser for delivery to a manifold or pipeline that may be deployed upon the sea floor. Individual units of the system may be combined into a field interconnected to one or more such manifolds to increase the scale of the system.

13 Claims, 4 Drawing Sheets

(51) Int. Cl.
  *C25B 9/65*   (2021.01)
  *C25B 15/08*  (2006.01)
  *F03D 13/25*  (2016.01)

(56) References Cited

U.S. PATENT DOCUMENTS

| | | | |
|---|---|---|---|
| 8,823,198 B2* | 9/2014 | De Boer | B63B 35/44 |
| | | | 290/55 |
| 2003/0168864 A1 | 9/2003 | Heronemus et al. | |
| 2006/0082160 A1* | 4/2006 | Lee | F03D 9/25 |
| | | | 290/55 |
| 2007/0138021 A1* | 6/2007 | Nicholson | F03D 9/32 |
| | | | 205/628 |
| 2007/0145748 A1 | 6/2007 | Pierz | |
| 2009/0313896 A1* | 12/2009 | Glidewell | C25B 1/04 |
| | | | 48/190 |
| 2011/0037264 A1* | 2/2011 | Roddier | B63B 35/44 |
| | | | 290/55 |
| 2014/0102885 A1 | 4/2014 | Devine | |
| 2015/0144500 A1* | 5/2015 | James | C25B 15/08 |
| | | | 204/278 |
| 2015/0275850 A1 | 10/2015 | Numajiri | |

OTHER PUBLICATIONS (PCT) European Patent Office (ISA/EP), International Search Report and Written Opinion of the International Searching Authority, International Application No. PCT/GB2018/053251, 13 pages, Jul. 9, 2019.

* cited by examiner

OFFSHORE WIND TURBINE SYSTEM FOR THE LARGE SCALE PRODUCTION OF HYDROGEN

CROSS-REFERENCE TO RELATED APPLICATIONS

This application is a national stage filing of International Application No. PCT/GB2018/053251 (International Publication No. WO 2020/095012), filed on Nov. 9, 2018, which is incorporated herein by reference in its entirety.

The present application is directed to wind turbine systems and, more particularly, to a modular, offshore wind turbine system that incorporates the electrolysis of seawater for the large scale production and delivery of hydrogen.

BACKGROUND

As a result of global climate change, nations and industries are seeking to develop "decarbonized" sources of heating and transportation fuels for use in commercial, domestic, and other sectors of the economy. Currently, significant research and development efforts are being directed towards the production of biofuels, where specialty crops, silage, or woody waste materials are processed and converted into "carbon neutral" fuels such as ethanol. Also, significant research and development efforts are being directed towards the production of "reduced carbon" fossil fuels such as syngas and so-called "blue hydrogen," where feedstocks such as coal, oil, or, in the latter case, methane, are reformed in combination with carbon capture technologies to produce lighter, less carbon-bearing fuels such as methane or hydrogen for use in upgraded gas distribution networks and a growing number of compressed-gas-fueled vehicles. Research and development efforts are also exploring various methods for producing "green hydrogen," i.e., hydrogen generated from the electrolysis of water using carbon-free energy sources such as wind, solar, and tidal energy, which of course could also be used in upgraded gas distribution networks and compressed-gas-fueled vehicles. Green hydrogen production has the advantage of being carbon neutral without requiring the collection, management, and subsequent disposal of agricultural materials and organic waste required for the production of most other carbon neutral fuels. Green hydrogen production also has the advantage of being carbon neutral without requiring the use of carbon capture technologies to convert the carbon contained in a fossil fuel into useful materials or to concentrate carbon removed from the process for interment within underground reservoirs. Thus, there is a need for economically viable systems for the large scale production of green hydrogen fuel.

SUMMARY

Disclosed is an offshore wind turbine system for the large scale production of hydrogen from seawater. The system includes a floating tower structure, a wind turbine generator, a lift pump, a desalination unit, an electrolysis unit, and an export riser. The floating tower structure may be secured to the sea floor by a suction anchor for deepwater deployment. The lift pump, desalination unit, and electrolysis unit are powered by the wind turbine generator and configured to pump, desalinate, and electrolytically split seawater, respectively. The hydrogen generated by the electrolysis unit is provided to the export riser for delivery to a manifold or pipeline that may be deployed upon the sea floor. The system is modular in the sense that the system is substantially self-contained (excepting the connection of the export riser to a manifold or pipeline) and self-sufficient (excepting expected maintenance), and that individual units of the system may be combined into a field interconnected to one or more such manifolds to increase the scale of the system.

DETAILED DESCRIPTION

Figure 1:
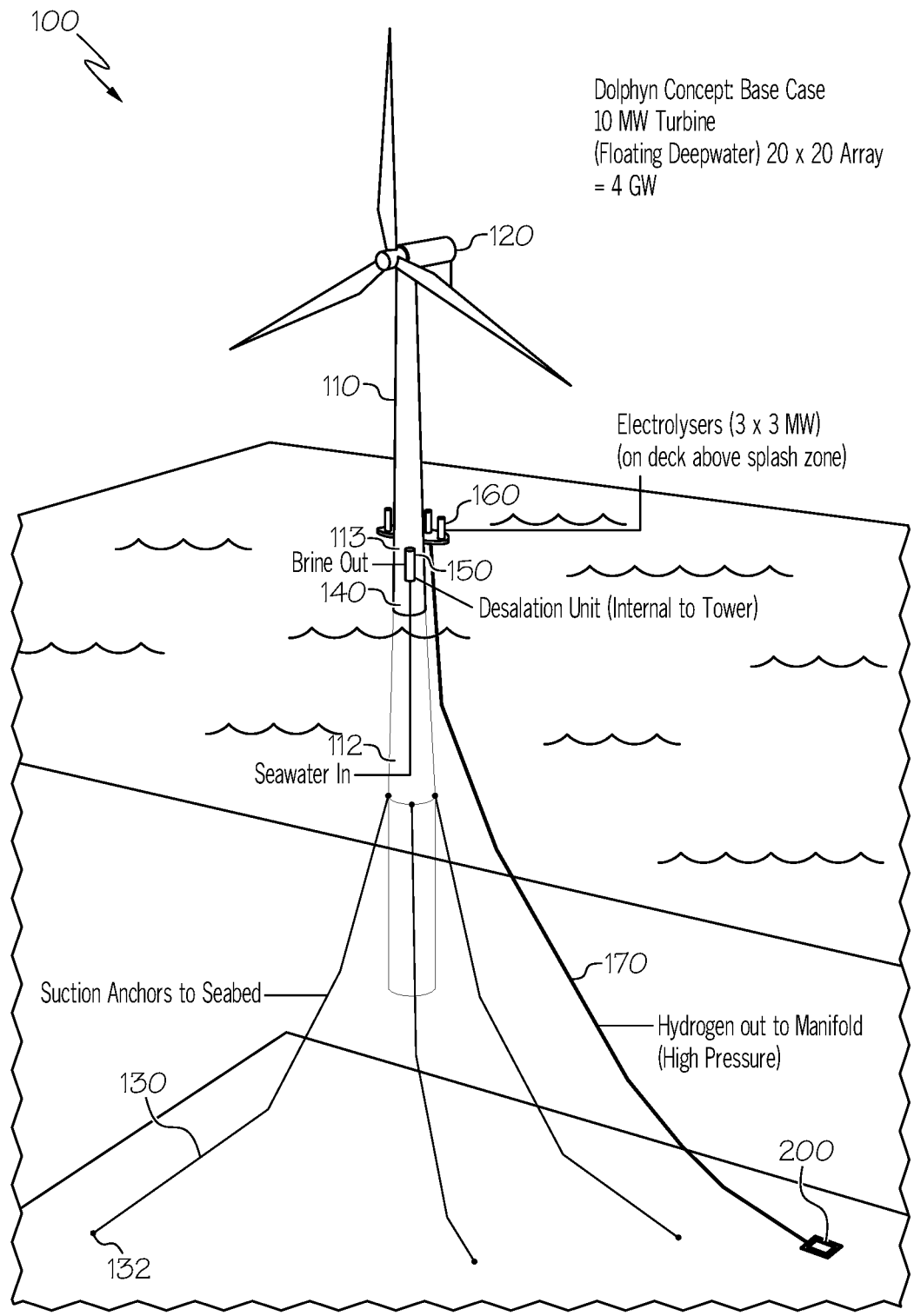
FIG. 1 is an illustration of an exemplary aspect of the disclosed system.

As shown in FIG. 1, the present system is an offshore wind turbine system for the production of hydrogen from seawater. The system 100 includes a floating tower structure 110 that supports a wind turbine generator 120. The floating tower structure 110 may take one of several forms, discussed in further detail below. The floating tower structure 110 may be secured to the sea floor by a mooring cable 130 and suction anchor 132 or a system of such mooring cables and suction anchors for deepwater deployment, although it will be appreciated that the floating tower structure 110 could be anchored by any of a block anchor, a gravity anchor, a screw anchor, or the like. The wind turbine generator 120 is mounted at an elevated position on the floating tower structure 110, generally at a proximal end, although it will be appreciated that the wind turbine generator 120 may be one of multiple wind turbine generators distributed along an elevated length of the floating tower and/or below a more proximal portion of the tower structure that may bear navigational warning beacons, telemetry antenna, and other such tower-borne equipment. The wind turbine generator 120 may be configured for a nominal power generation rate of 5 to 15 MW, e.g., 10 MW, and the corresponding rotor configured to support a rotor diameter of 100 to 250 meters, with rotor diameter generally increasing with increasing power generation rate. The floating tower structure 110 may have a height above a predetermined design waterline of 1.2 to 1.4 times the rotor diameter of the wind turbine generator 120.

Figure 2:
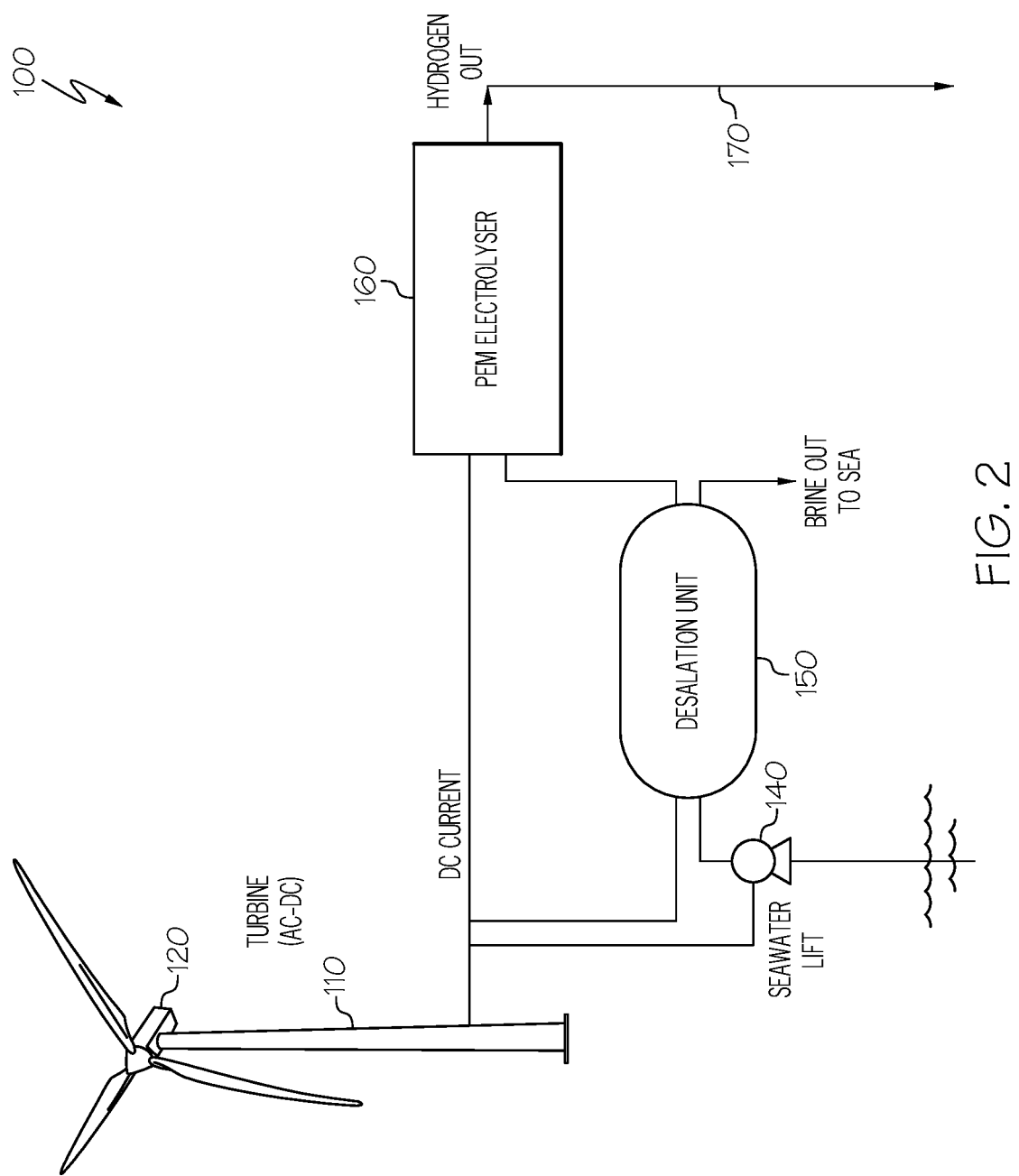
FIG. 2 is a schematic diagram of the system shown in FIG. 1.

As otherwise shown in FIG. 2, the system 100 includes a lift pump 140, a desalination unit 150, and an electrolysis unit 160 powered by the wind turbine generator 120 and, in a first embodiment, disposed on an elevated tower portion of the floating tower structure 110. The lift pump 140 is configured to supply seawater to the desalination unit 150, and the desalination unit is configured to supply desalinated seawater to the electrolysis unit 160. In some aspects, as shown in FIG. 1, the tower structure 110 may include a spar sub-structure 112 and the lift pump 140 and desalination unit 150 may be disposed within the interior of the elevated tower portion 113. In other aspects, the lift pump 140 and desalination unit 150 may be disposed upon the exterior of the elevated tower portion 113. Locating the lift pump 140 and desalination unit 150 within the interior of the elevated tower portion 113 may permit maintenance of these units to be performed under relatively protected conditions, while locating the lift pump 140 and desalination unit 150 upon the exterior of the elevated tower portion 113 may permit relatively simpler replacement of these units in lieu of on-site maintenance.

The desalination unit 150 may be a thermal desalination unit, but may alternately be a reverse osmosis desalination unit, electrodialysis desalination unit, membrane distillation desalination unit, or the like. The power demand of the lift pump 140 and desalination unit 150 may be relatively modest compared to the power demand of the electrolysis unit 160, such that the type of desalination unit 150 may be selected based upon reliability and maintenance period rather than energy efficiency per se. For example, in a 10 MW unit 100 (nominal 10 MW wind turbine generator 120 and 3×3 MW electrolysis units 160), water demand will be about 2 m$^3$ per hour, with a pump and thermal desalination power demand of about 1% of the maximum available electrical power.

The electrolysis unit 160 is preferably disposed upon the exterior of the elevated tower portion 113 above the "splash zone," i.e., above a predetermined threshold wave height conventionally used for sea-borne structures where the system has been deployed. For example, a threshold height of 20 meters above the design waterline may be used for seaborne-structures deployed within the North Sea. Locating the electrolysis unit 160 upon the exterior of the elevated tower portion 113 may prevent the build-up of hydrogen gas to explosive concentrations in the event of a leak from the electrolysis unit 160 or export riser 170 in comparison to locating the former within the interior of the elevated tower portion 113. It will be appreciated that in other aspects the electrolysis unit 160 could be disposed within the interior of the elevated tower portion 113, however such a placement would require venting of at least the surrounding portion of that interior as well as provision for the exclusion of or management of water intrusion through such venting.

The electrolysis unit 160 may be a polymer membrane electrolysis unit having a power demand of 1 to 5 MW, e.g., 3 MW as shown in FIG. 1, although it will be appreciated that other types of electrolysis units may be used with the system 100. The electrolysis unit 160 may be one of a plurality of electrolysis units 160, e.g., three units 160 as shown, similarly disposed on the floating tower structure 110 in order to permit scaling of electrolysis unit power demand to the power actually generated by the wind turbine generator 120 at that time and/or to provide redundancy to the hydrogen generating capacity of the system 100.

The electrolysis unit 160 may itself be configured to generate hydrogen at pressures of up to 40 bar. Alternately, the system may include a booster pump (not shown) which draws hydrogen from the electrolysis unit 160 and delivers hydrogen an export riser 170. The export riser 170 may be manufactured from a flexible composite material so as to permit relative movement between the floating tower 110 and a manifold 200 deployed upon the sea floor. The manifold 200 may be connected to a pipeline 210 (shown in FIG. 4) comprising a collecting pipeline for a hydrogen distribution network, such as a pipeline running to an offshore or onshore storage facility, e.g., salt cavern storage facility, or to an onshore gas distribution network. In systems in which the system unit 100, pipeline 210, and entry point to an onshore gas distribution network are controlled by the same entity or cooperative, the pipeline may be selectively or controllably operable to provide substantial 'line-pack' storage capacity for the hydrogen generated by the system unit 100 within the pipeline 210 itself. It will be appreciated that the export riser 170 may be connected to a pipeline 210 without a manifold, but that a manifold 200 is preferred so that the system unit 100 shown in FIG. 1 may be one of a plurality of units 100 combined into a field interconnected to one or more such manifolds to increase the scale of the production of hydrogen.

Figure 3:
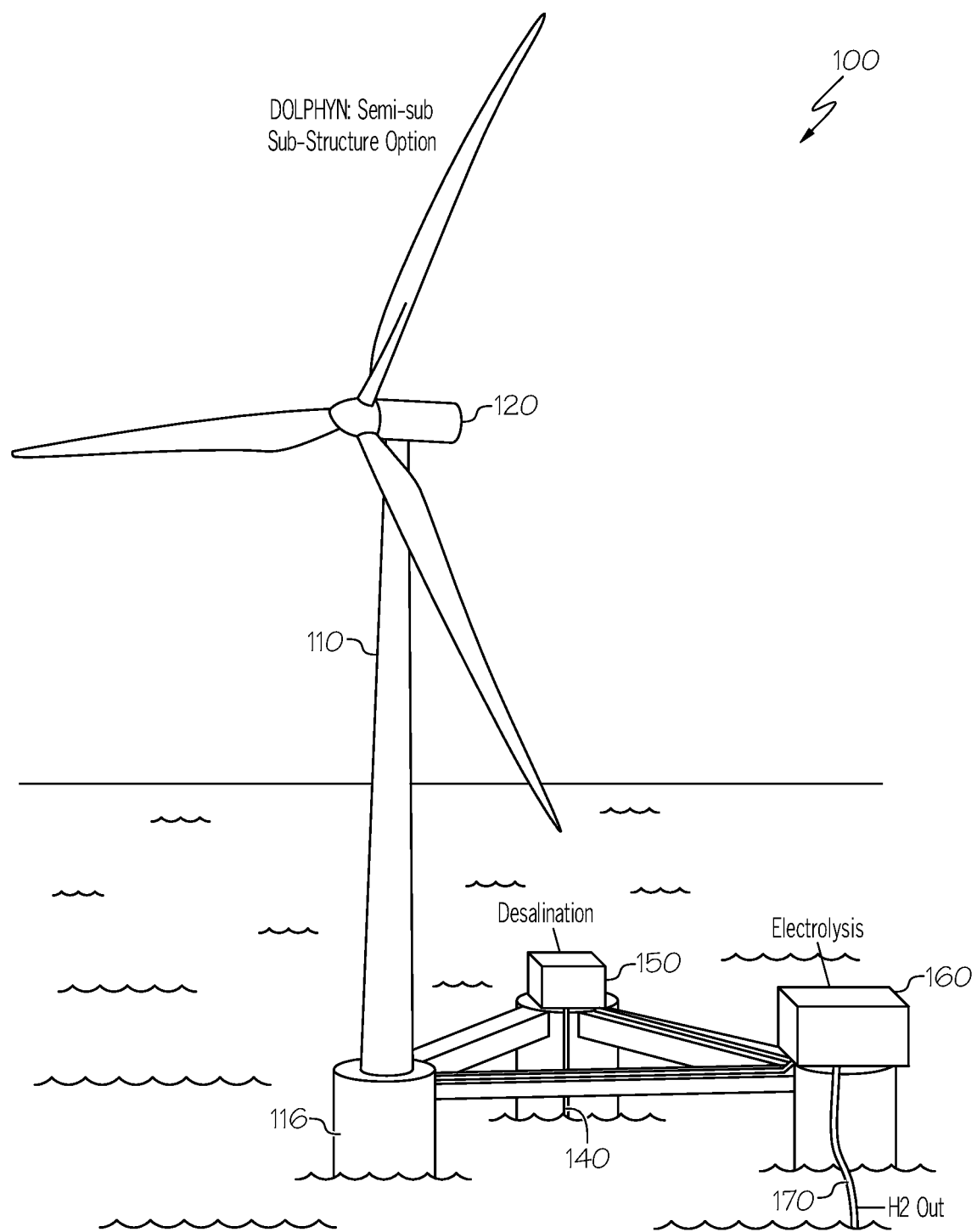
FIG. 3 is an illustration of an alternate tower substructure and configuration of system elements.

In another embodiment, shown in FIG. 3, the floating tower 110 may include a semi-submersible sub-structure 114 comprising at least three columns 116 interconnected by a proximal frame 118 and an opposing, submerged horizontal plate (not shown). The wind turbine generator 120 may be mounted on the floating tower 110 above one of the columns 116. The lift pump 140 and desalination unit 150 may be disposed on another one of the columns 116, and it will be appreciated that in some aspects the desalination unit 140 may be provided as a containerized or pre-packaged unit that is secured to a top of the respective column 116, which may permit replacement of the desalination unit 150 in lieu of on-site maintenance. The electrolysis unit 160 may be disposed on yet another one of the columns 116, and again it will be appreciated that in some embodiments the electrolysis unit 160 may be provided as a containerized or pre-packaged unit that is secured to a top of the respective column 116, potentially permitting replacement of the electrolysis unit 160 in lieu of on-site maintenance.

Figure 4:
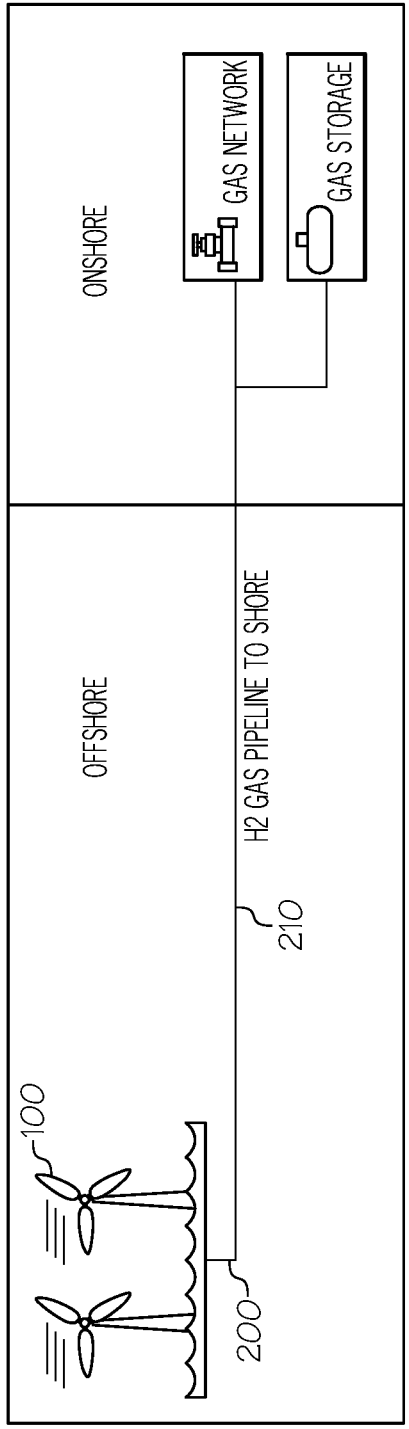
FIG. 4 is a schematic diagram of the system shown in FIG. 1 interconnected with an undersea pipeline
Figure 5:
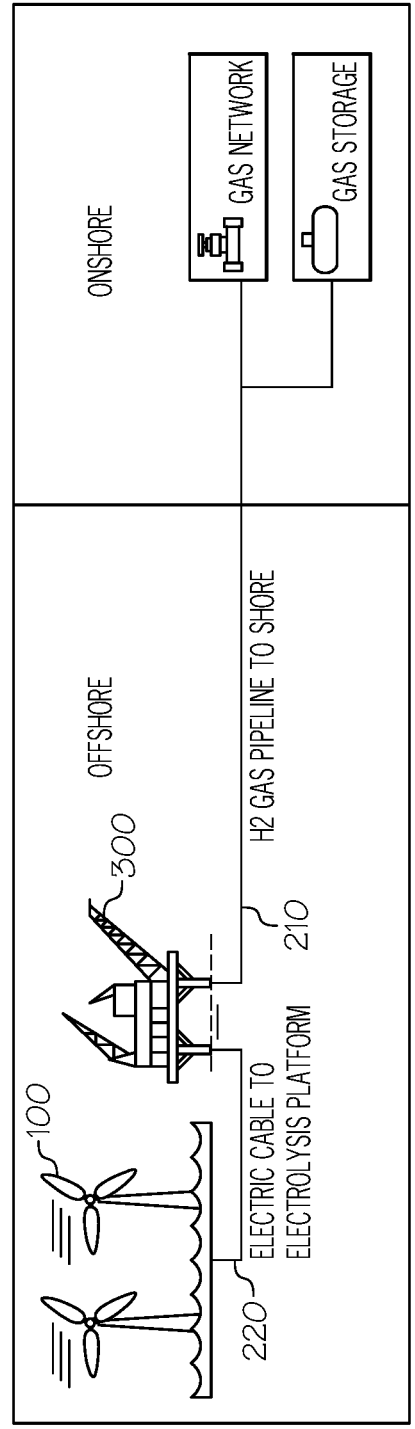
FIG. 5 is a schematic diagram of an alternate configuration of the system interconnected with an undersea, local electrical cable network and undersea pipeline.

In an alternate configuration, indicated in FIG. 5, the floating tower structure 110 and wind turbine generator 120 may supply power to a local (unconnected to a national or regional electricity grid), relatively short-distance undersea electrical cable 220 connected to a separate floating or direct-anchored platform 300. The platform 300 may be a vessel, a barge or so-called "floating production system," or an offshore platform facility. The platform, rather than the floating tower structure 110, includes the lift pump 140, desalination unit 150, and electrolysis unit 160. The platform 300 also includes the export riser 170, if floating or direct-anchored, or other conventional connection to the pipeline 210, if direct anchored. The alternate configuration may provide some advantages of scale in concentrating the electrical generation capacity of multiple floating tower structures 110 and wind turbine generators 120 into a platform 300 for the generation of hydrogen, but those advantages trade off against the modularity of the system shown in FIGS. 1 and 4 and other associated advantages.

In particular, with reference to FIGS. 1 and 4, the system 100 provides a scalable solution that can be used to incrementally build large scale deepwater developments without the cost of high voltage switchgear/transformers and energy losses associated with electrical transmission through undersea cables, particularly long distance cables to onshore facilities. The use of floating tower structures 110 also permits an expansion of wind-energy generation further from shore in high wind areas that are not visible from land. A distribution of electrolysis units 160 on floating tower structures 110 reduces asset risk and cost in comparison to concentration on a smaller number of offshore platforms or in an onshore facility, and also permits brine from the attendant desalination units 150 to be discharged over a wide area so as to minimize potential environmental impact.

What is claimed is:

1. An offshore wind turbine system for the production of hydrogen from seawater, the system comprising:
   a floating tower structure that supports a wind turbine generator;
   a seawater lift pump;
   a desalination unit;

an electrolysis unit disposed upon an exterior of a tower portion of the floating tower structure; and an export riser;

wherein the lift pump, desalination unit, and electrolysis unit are powered by the wind turbine generator, with the lift pump configured to supply seawater to the desalination unit and the desalination unit configured to supply desalinated seawater to the electrolysis unit;

wherein the electrolysis unit is configured to provide hydrogen generated from electrolytically split, desalinated seawater to the export riser for delivery to a manifold or pipeline; and wherein the lift pump and the desalination unit are disposed within the interior of the tower portion.

2. The system of claim 1, wherein the floating tower is secured to the sea floor by an anchor and a mooring cable connecting the floating tower structure to the anchor.

3. The system of claim 1, wherein the floating tower structure includes a spar sub-structure.

4. The system of claim 1, wherein the electrolysis unit is disposed above a predetermined threshold wave height.

5. The system of claim 1, wherein the electrolysis unit is one of a plurality of electrolysis units similarly disposed upon the exterior of the tower portion.

6. The system of claim 1, wherein the lift pump and the desalination unit are disposed upon the tower portion.

7. The system of claim 1, wherein the floating tower structure includes a semi-submersible sub-structure comprising at least three columns interconnected by a proximal frame and an opposing horizontal plate.

8. The system of claim 7 wherein the wind turbine generator is mounted on the floating tower above one of the columns, and the lift pump and the desalination unit are disposed on another one of the columns.

9. The system of claim 8 wherein the desalination unit is a containerized or pre-packaged unit that is secured to a top of the respective column.

10. The system of claim 8, wherein the electrolysis unit is disposed on yet another one of the columns.

11. The system of claim 10, wherein the electrolysis unit is a containerized or pre-packaged unit that is secured to a top of the respective column.

12. The system of claim 1, wherein the floating tower structure, wind turbine generator, lift pump, desalination unit, electrolysis unit, and export riser comprise a system unit, and a plurality of such system units are interconnected via their respective export risers to a manifold deployed upon the sea floor.

13. The system of claim 12 wherein the manifold is connected to a pipeline, and the pipeline is configured so as to be selectively or controllably operable to provide 'line-pack' storage capacity for the hydrogen generated by the plurality of system units within the pipeline.

* * * * *